June 19, 1962 H. W. CHRISTENSON 3,039,328
TRANSMISSION
Filed July 5, 1960 2 Sheets-Sheet 2

INVENTOR.
Howard W. Christenson
BY
ATTORNEY

United States Patent Office 3,039,328
Patented June 19, 1962

3,039,328
TRANSMISSION
Howard W. Christenson, Indianapolis, Ind., assignor to General Motors Corporation, Detroit, Mich., a corporation of Delaware
Filed July 5, 1960, Ser. No. 40,727
19 Claims. (Cl. 74—796)

This invention relates to an infinitely variable transmission and particularly an infinitely variable transmission of the friction type having planetating friction discs.

This invention is illustrated by an infinitely variable friction type transmission employing a plurality of planetary friction elements arranged to bodily rotate about the transmission axis and to rotate about their individual axes. Each planetary friction element has the form of a sector of a sphere providing a partial spherical surface and a plane or flat circular surface. The planetary elements are mounted on a free carrier for rotation about their individual radial axes perpendicular to the circular flat surface at the center with the flat surface on the internal side and the spherical surface on the external side. An input friction disc engages the spherical surface to drive the planetary elements. An output friction disc rotatable about the transmission axis contacts the flat surface of each planetary disc and may be moved axially to vary the ratio.

An object of the invention is to provide an infinitely variable friction transmission having a disc output and providing a larger range of torque multiplication ratios in one direction of operation than in the opposite direction of operation.

Another object of the invention is to provide an infinitely variable friction type transmission having a plurality of planetating members formed as a sector of a sphere mounted on a carrier rotating about an axis and also rotating about an axis with respect to the carrier to frictionally drive output member.

Another object of the invention is to provide in a planetary infinitely variable friction type transmission a plurality of semispherical friction discs mounted on radial axes of a carrier member and having flat surfaces facing each other and contacting a cylindrical friction disc.

Another object of the invention is to provide in a transmission having a friction drive and a lockup clutch, a control system to engage the lockup clutch and to disengage the friction drive.

These and other objects of the invention will be more apparent from the following description of the preferred embodiments of the invention.

Figure 1:
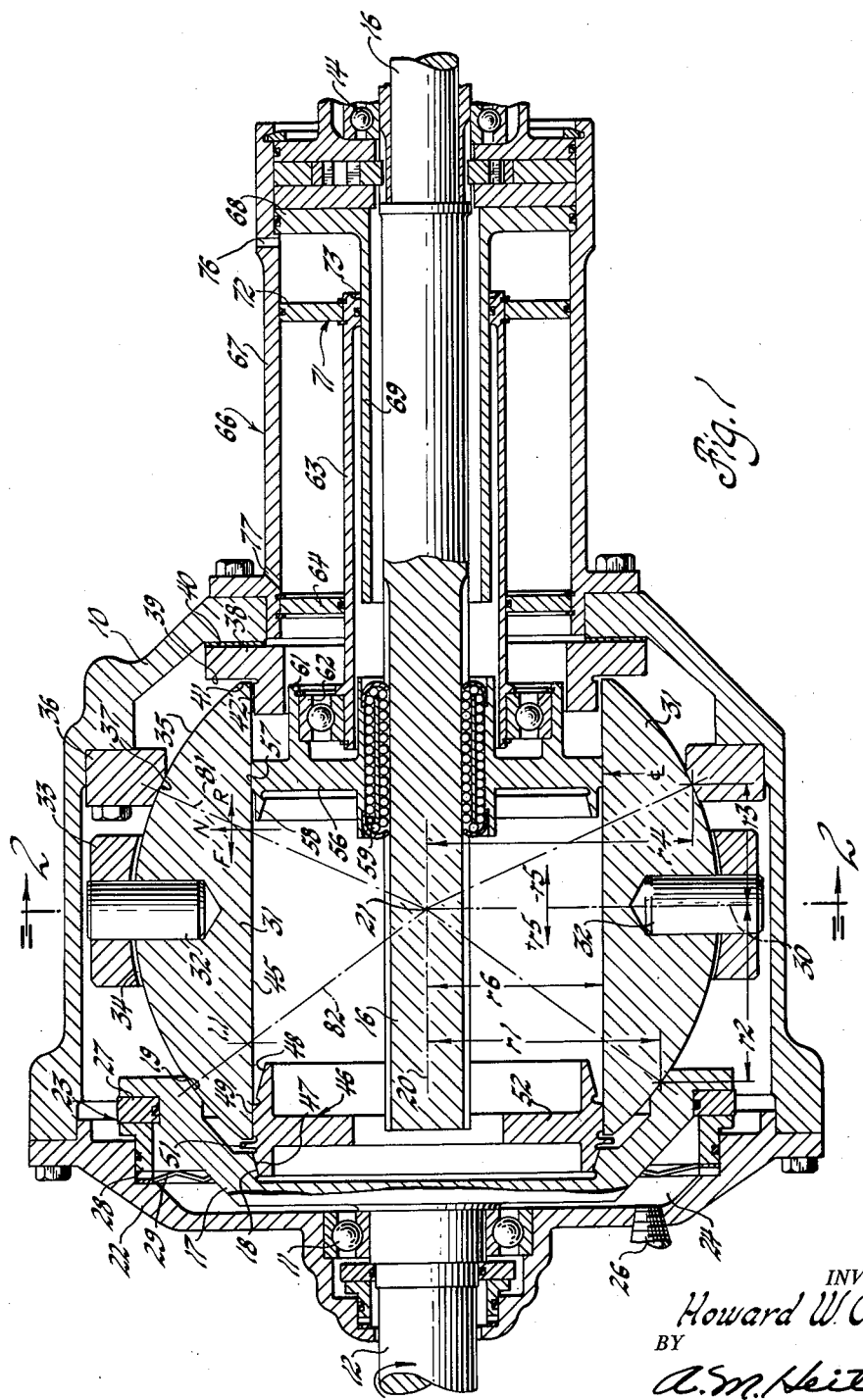
Figure 2:
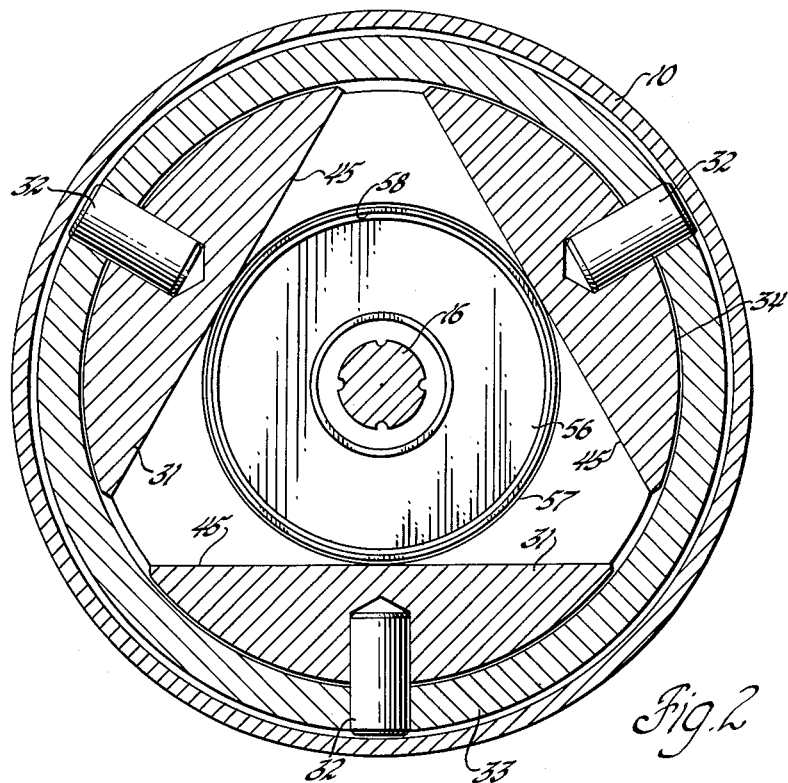
Figure 3:
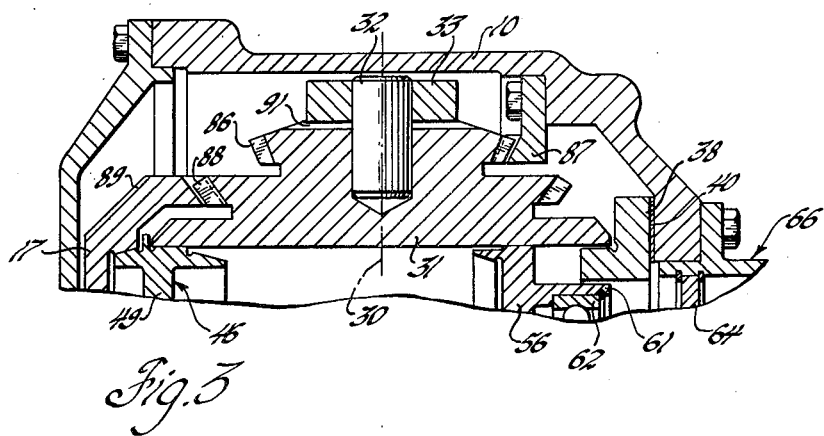

FIGURE 1 is a sectional view of a transmission;
FIGURE 2 is a section of FIGURE 1 on line 2—2;
FIGURE 3 is a partial sectional view similar to FIGURE 1, illustrating a modification.

The infinitely variable friction drive transmission is located in a housing 10 having a bearing 11 rotatably supporting input shaft 12 and a bearing 14 rotatably supporting the output shaft 16. The input shaft 12 drives an input disc 17 having a conical clutch surface 18 and a drive surface 19 formed as an annular section of a sphere having a center 21. The disc 17 is hydraulically sealed to the front wall 22 of the housing 10 by the running seal 23 to provide a chamber 24 which is supplied with fluid via line 26 to bias the drive surface 19 of disc 17 into engagement with the planetary friction elements. Seal 23 consists of the ring 27 suitably secured and sealed at the outer edge of the disc 17 and a ring 28 suitably sealed and non-rotatably but axially slidably mounted on a shoulder of the front wall 22. The undulated annular spring 29 resiliently biases the member 28 into contact with member 27. The perfectly flat contacting faces of these seals provide a running seal.

The planetary friction discs 31 are mounted for rotation on radial shafts 32 which are fixed in an annular ring 33. The planetary discs 31 each have a spherical external surface 35 formed as a sphere having a center at 21 and an inner plane surface 45. The ring 33 concentric with each pin 32 has a spherical surface 34 spaced from the spherical surface 35 of discs 31. The ring 33 is unsupported and merely holds the discs 31 in the relative position shown for planetary movement about the axis of shaft 32 and rotary movement about the axis 20 of the shaft 16. The drive surface 19 of input disc 17 contacts the spherical surface 35 of planetary discs 31 to drive the discs. The support ring 36 is suitably secured to the housing 10 and a reaction surface 37 formed as an annular section of a sphere contacting the outer spherical surface 35 of discs 31 to hold the discs against radial outward movement. The inner and axial support ring 38 is rotatably mounted in the housing 10 and has a radial annular surface 39 contacting a cylindrical edge portion 41 concentric with pin 32 on the discs 31 to limit movement of ring 38 to the left. The inner support ring 38 also has a cylindrical surface 42 concentric with axis 20 contacting the inner plane surface of disc 31 to prevent inward movement. The trust bearing surfaces or bearing 40 between ring 38 and housing 10 laterally locate the ring.

The lockup clutch ring 46 has a conical clutch surface 47 for engaging the conical clutch surface 18 on the input disc 17, and a conical clutch surface 48 adapted to be contacted by the output clutch surface. The lockup clutch member 46 also has a cylindrical surface 49 to provide a rolling support for the inner plane surface 45 of planetary discs 31. An annular rib 51 on the outer surface of clutch member 46 limits axial movement of member 46. The inner rib 52 is a stiffening member. The output disc 56 has a cylindrical surface 57 contacting the inner plane surface 45 of disc 31 and a clutch cone surface 58 for contacting the clutch cone surface 48. The output disc 56 is splined by the ball bearing splines 59 to the output shaft 16. Disc 56 has an annular extension 61 to which the outer race of transfer bearing 62 is secured. The inner race of the bearing 62 is secured to the control sleeve 63 which extends through the central aperture in end wall 64 of cylinder 66. The cylinder has an outer cylindrical wall 67, the end wall 64 and another end wall 68. The end wall 68 also integrally supports an inner cylinder wall or sleeve 69. The control sleeve 63 has at its end an annular piston 71 formed by the annular plate 72 and the projection 73. The annular piston 71 has suitable sealing rings at the outer surface contacting the outer cylinder wall 67 and the inner surface contacting the inner cylinder wall 69. It will be seen that fluid may be supplied via port 76 to move the piston and output disc to the left while fluid supplied via port 77 will move the piston and disc to the right.

Operation

This transmission may be operated to provide an input to output ratio for forward drive between infinity and 1:1 ratio and for reverse drive from minus infinity to −2:1. The gear ratio of the transmission in each operating position may be determined from the ratio.

$$\text{Ratio} = \frac{(r_1 r_3 + r_2 r_4) r_6}{r_1 r_3 r_6 \pm r_1 r_4 r_5}$$

in which
$r_1$ is the radius from the axis 20 to the center of the contact between the surface 19 and spherical surface of planetary discs 31.

$r_2$ is the radius about the axis 30 of the planetary discs to the center of the contact between the input disc at surface 19 and the spherical surface of planetary disc 31.

$r_3$ is the radius about the axis 30 of planetary disc 31 to the point of contact between the outer bearing surface 37 and the spherical surface of disc 31.

$r_4$ is the radius about the output shaft axis 20 at the center of contact of reaction surface 37 and the spherical surface of disc 31.

$r_5$ is the distance from the plane perpendicular to the axis 20 at the spherical center 21 to the center line of the output disc 56. This plane is also determined by the axis 30. This value varies and may either be positive or negative depending on whether the disc 56 is between the input disc and the center 21 or on the other side of center 21.

$r_6$ is the radius about axis 20 of the cylindrical surface of the output disc 56.

When the input shaft 12 is driven to rotate the input disc 17 clockwise as viewed from the input end of the transmission and indicated by the arrow in FIGURE 1, the disc 17 through the contact of spherical surface 19 with the spherical surface 35 of discs 31, planetates and rotates the discs 31. The discs 31 will rotate about the individual radial axes 30 on pins 32 fixed to ring 33 and the assembly consisting of the discs and ring 33 will rotate about axis 20. The discs will roll on the freely rotating support 38 and the surface 49 of the lockup clutch member 46. The lockup clutch member 46 will rotate faster than the input disc 17 since the surface 49 of disc 46 contacts the surface 45 of planetary disc 31 at a greater radius about axis 30 than the 1:1 ratio line at the intersection of line 82 with surface 45. The support disc 38 will rotate in the opposite direction at a reduced speed. Since the discs 31 bodily rotate about axis 20 and rotate about pin 32, the driven disc 56 will be driven, when to the left of axis 30 at the sum of these speeds, and when to the right of axis 30 at the bodily rotating speed less the reversely rotating speed of the disc 31 about axis 30. Thus, where the line 81 crosses the plane surface 45 of discs 31 is the neutral position N. When the center line of output disc 56 coincides with neutral position line N, the transmission is in neutral, since the forward bodily rotation of the discs 31 about axis 20 is equal to the reverse or negative rotation of surface 45 of discs 31 about axis 30. Movement of the disc 56 to the right, as indicated by the arrow R, provides reverse drive and movement in the forward direction toward the disc 17, as indicated by the arrow F, provides forward drive.

Hydraulic fluid under pressure is supplied by line 26 to the chamber 24 to bias the input disc 17 so that the surface 19 is in firm line contact with the spherical surface of discs 31 and maintains the discs in contact with the surfaces 37, 42, 49 and 57. When the discs 31 are planetating or rolling on these guide surfaces under the drive of the input disc 17, the annular ring 33 and pins 32 hold the discs 31 in the spaced position shown in FIGURE 2 and the ring 33 and discs 31 rotate about the axis 20 as the discs 31 roll about the axis 30.

Lockup drive is provided when the center line of the output disc 56 reaches a point on the flat surface 45 of discs 31, indicated by the line 1:1, where the line 82 between center 21 and the center of surface 19 crosses flat surface 45. At that point, the conical surface 58 fully engages conical surface 48 and pushes conical surfaces 18 and 47 together to engage the direct drive clutch to provide direct drive. The output disc 56 is preferably urged through the servo motor actuating mechanism with sufficient force to act through the lockup clutch ring 46 to move the input disc 17 against the biasing force of the fluid pressure in chamber 24 to relieve or completely separate the contact between the surface 19 and the discs 31 to eliminate the friction of the friction drive element in lockup.

In a modified form of the transmission, the planetary discs 31 have an outer small diameter bevel gear 86 meshing with an annular bevel gear 87 secured to the housing 10 with the mean pitch line coinciding with line 81 of FIGURE 1. The inner bevel gear 88 formed about the axis 30 of the pivot shaft 32 meshes with the annular gear 89 on the input disc 17 rotatably mounted about the axis 20 with the mean pitch line coinciding with line 82 of FIGURE 1. The lockup clutch member 49 and the output disc 56 is the same as described above and shown in FIGURE 1. Since the friction members do not hold planetary discs 31 radially inwardly, a thrust bearing must be provided at the outer surface 91 of discs 31 and the inner surface of ring 33 so that the planetary discs 31 will rotate in engagement with the gearing. This arrangement will function to provide the same ratios as provided by the arrangement shown in FIGURE 1.

The above described preferred embodiments are illustrative of the invention, which may be modified by those skilled in the art, within the scope of the appended claims.

I claim:

1. In an infinitely variable transmission; an input and output member; a friction element having the form of a section of a sphere with a spherical side and a flat side; means mounting said friction element for planetary movement including reaction means providing a reaction for said friction element, one of said members engaging said spherical side in friction drive contact, and the other of said members engaging the flat side of said friction element in friction drive contact.

2. In an infinitely variable transmission, an input and output member, a friction element having the form of a section of a sphere with a spherical side and a flat side, means mounting said friction element for planetary movement about a planetating axis coaxial with the axis of one of said members and rotary movement about its own axis including reaction means engaging said element, one of said members engaging said spherical side in friction drive contact, and the other of said members engaging the flat side of said friction element in friction drive contact.

3. In an infinitely variable transmission, an input and output member, a friction element having the form of a section of a sphere with a spherical side and a flat circular side and having an axis passing through the center of the spherical and circular sides, means mounting said friction element for planetary movement about a planetating axis coaxial with the axis of one of said members and rotary movement about its own axis including reaction means engaging said element, one of said members engaging said spherical side in friction drive contact, and the other of said members engaging the flat side of said friction element in friction drive contact.

4. The invention defined in claim 3 and said axis of said element being perpendicular to said planetaing axis.

5. In an infinitely variable transmission, an input and output member mounted coaxially on a transmission axis, a friction element having the form of a section of a sphere with a spherical side and a flat circular side and having an axis passing through the centers of the sides, means mounting said friction element for planetary movement about the transmission axis and rotary movement about their axis including a stationary reaction element engaging said element, a portion of one of said members engaging said element in friction drive contact, and the other of said members engaging said friction element in friction drive contact.

6. The invention defined in claim 5 and said reaction element and said one of said members engaging said friction element at different radii about the axis of said friction element.

7. The invention defined in claim 5 and said reaction element and said one of said members engaging said friction element at different radii about the axis of said friction element, and said other of said members engaging said flat side and being mounted for movement transversely of said flat side.

8. In an infinitely variable transmission; an input and output member; a friction element having the form of a section of a sphere with a spherical side and a flat side; means mounting said friction element for planetary movement including reaction means providing a reaction for said friction element, one of said members engaging said spherical side in friction drive contact, the other of said members engaging the flat side of said friction element in friction drive contact, and means to move said other of said members across the flat side of said element.

9. In an infinitely variable transmission, an input member and an output member located on the transmission axis, a carrier member rotatable about the transmission axis, a planetary disc member rotatably mounted on said carrier member on an axis radial to the transmission axis, said planetary members having a spherical outer surface and a flat internal surface, a friction disc driven by said input member and contacting said spherical surface of said planetary member on one side of said radial axis, a fixed reaction bearing ring contacting said spherical surface on the other side of said radial axis, bearing means to maintain said planetary member in a fixed radial position about said transmission axis, and an output friction disc axially movable and drivingly connected to said output member having a cylindrical surface contacting said flat surface of said planetary member.

10. In an infinitely variable transmission, an input member and an output member located on the transmission axis, a carrier member rotatable about the transmission axis, a planetary disc member rotatably mounted on said carrier member on an axis radial to the transmission axis, said planetary members having a spherical outer surface and a flat internal surface, a friction disc driven by said input member and contacting said spherical surface of said planetary member on one side of said radial axis, biasing means providing a biasing force providing engagement between said input member and said planetary member, a fixed reaction bearing ring contacting the said spherical surface on the other side of said radial axis, bearing means to maintain said planetary member in a fixed radial position about said transmission axis, an output friction disc axially movable and drivingly connected to said output member having a cylindrical surface contacting said flat surface of said planetary member, and lockup clutch means operative to provide a direct drive and to reduce the biasing force between said input and planetary members.

11. In an infinitely variable transmission, an input member and an output member located on the transmission axis, a carrier member rotatable about the transmission axis, a planetary disc member rotatably mounted on said carrier member on an axis radial to the transmission axis, said planetary members having a spherical outer surface and a flat internal surface, a friction disc driven by said input member and contacting said spherical surface of said planetary member on one side of said radial axis, biasing means to bias said input member into contact with said planetary member, a fixed reaction bearing ring contacting said spherical surface on the other side of said radial axis, bearing means to maintain said planetary member in a fixed radial position about said transmission axis, an output friction disc axially movable and drivingly connected to said output member having a cylindrical surface contacting said flat surface of said planetary member, and lockup clutch means movable with said output friction disc to engage said input member to provide direct drive and to disengage said input member from said planetary member.

12. In an infinitely variable transmission, an input member and an output member located on the transmission axis, a planetary member mounted for rotation about the transmission axis having a spherical outer surface and a flat internal surface, a first friction disc driven by one of said members contacting said spherical surface of said planetary member at one circular line of contact, a fixed reaction bearing ring contacting said spherical surface to control movement at another circular line of contact, bearing means to maintain said planetary member in a planetary path about said transmission axis, a second friction disc axially movable and drivingly connected to another of said members having a cylindrical surface contacting said flat surface of said planetary member.

13. In an infinitely variable transmission, an input member and an output member each located on a transmission axis, a planetary element mounted for planetating movement about one transmission axis and rotary movement about its own axis having a spherical outer surface and a flat circular internal surface centered on the axis of the planetary element, a first disc driven by one of said members contacting said spherical surface of said planetary element at one radius from the axis of said element, a fixed reaction bearing ring contacting said spherical surface to control movement at another radius from the axis of said element, bearing means to maintain said planetary member in a planetary path about said transmission axis, a second friction disc axially movable and drivingly connected to another of said members having a cylindrical surface contacting said flat surface of said planetary member.

14. In a transmission, an input member, an output member, a planetary element mounted for planetating movement about a transmission axis and rotary movement about its own axis and having a flat surface perpendicular to said planetary element axis, input means connecting said input member to drive said planetary element at one radius about the axis of said planetary element, stationary reaction means having rolling contact with said planetary element at another radius about the axis of said planetary element and output means consisting of a friction wheel contacting said flat surface of said planetary element at varying radii.

15. In a transmission, an input member, an output member, a planetary element mounted for planetating movement about a transmission axis and rotary movement at its own axis, said transmission axis and said planetary element axis intersecting at a point, said planetary element having a flat surface facing said transmission axis, input means connecting said input member to drive said planetary element at one radius about the axis of said planetary element along a line of contact on a radius extending through said point, stationary reaction means having rolling contact with said planetary element at another radius about the axis of said planetary element along a line of contact on a radius extending through said point and output means consisting of a friction wheel having an external cylindrical friction surface contacting said flat surface of said planetary element at varying radii.

16. In a transmission, an input member, an output member, a planetary element mounted for planetating movement about a transmission axis and rotary movement at its own axis and having a flat surface perpendicular to said planetary element axis, input friction means connecting said input member to drive said planetary element at one radius about the axis of said planetary element, stationary friction reaction means having rolling contact with said planetary element at another radius about the axis of said planetary element and output means consisting of a friction wheel contacting said flat surface of said planetary element at varying radii.

17. In a transmission, an input member, an output member, a planetary element mounted for planetating movement about a transmission axis and rotary movement at its own axis and having a flat surface perpendicular to said planetary element axis, input gear drive means connecting said input member to drive said planetary element at one radius about the axis of said planetary element, stationary gear reaction means having rolling contact with said planetary element at another radius about the axis of said planetary element and output means consisting of a friction wheel contacting said flat surface of said planetary element at varying radii.

18. In an infinitely variable transmission, an input member and an output member located on the transmission axis, a carrier member rotatable about the transmission axis, a planetary disc member rotatably mounted on said carrier member on an axis radial to the transmission axis, said planetary members having a spherical outer surface and a flat internal surface, a friction disc driven by said input member and contacting said spherical surface of said planetary member on one side of said radial axis, means to bias said input member into contact with said planetary member, a fixed reaction bearing ring contacting said spherical surface on the other side of said radial axis, bearing means to maintain said planetary member in a fixed radial position about said transmission axis, and an output friction disc axially movable and drivingly connected to said output member having a cylindrical surface contacting said flat surface of said planetary member.

19. In an infinitely variable transmission, an input and an output member; a friction element having an axis of rotation perpendicular to the axis of rotation of one of said members and a flat side perpendicular to said axis of rotation of said friction element facing said axis of rotation of said one member; means mounting said friction element for planetary movement providing rotation about said axis of said one member and rotation about said axis of said friction element including reaction means in drive engagement with said friction element providing a reaction for said friction element, the other of said members in drive engagement with said friction element, and said one of said members engaging the flat side of said friction element in friction drive contact.

References Cited in the file of this patent
UNITED STATES PATENTS

| | | |
|---|---|---|
| 823,178 | Larsen et al. | June 12, 1906 |
| 2,574,530 | Castagna | Nov. 13, 1951 |
| 2,836,994 | Weber | June 3, 1958 |